(12) United States Patent
Jones

(10) Patent No.: US 6,549,592 B1
(45) Date of Patent: Apr. 15, 2003

(54) ENHANCED SYNCHRONIZATION BURST FOR OFDM SYSTEMS

(75) Inventor: Vincent K. Jones, Redwood Shores, CA (US)

(73) Assignee: Cisco Technology, INC, San Jose, CA (US)

(*) Notice: Subject to any disclaimer, the term of this patent is extended or adjusted under 35 U.S.C. 154(b) by 0 days.

(21) Appl. No.: 09/244,754

(22) Filed: Feb. 5, 1999

Related U.S. Application Data

(60) Provisional application No. 60/074,331, filed on Feb. 6, 1998.

(51) Int. Cl.[7] ............................................. H04L 7/00
(52) U.S. Cl. ........................ 375/354; 375/260; 370/509
(58) Field of Search ................................ 375/354, 355, 375/347, 260; 370/203, 210, 480, 509, 510

(56) References Cited

U.S. PATENT DOCUMENTS

| | | | |
|---|---|---|---|
| 5,282,222 A | | 1/1994 | Fattouche et al. ............. 375/1 |
| 5,625,651 A | * | 4/1997 | Cioffi ....................... 340/825.2 |
| 5,732,113 A | * | 3/1998 | Schmidl et al. ............. 375/354 |
| 6,208,695 B1 | | 3/2001 | Klank et al. ................. 375/260 |
| 6,252,908 B1 | * | 6/2001 | Tore ............................ 375/259 |
| 6,275,543 B1 | | 8/2001 | Petrus et al. ................. 375/324 |
| 6,381,251 B1 | | 4/2002 | Sano et al. .................. 370/480 |

FOREIGN PATENT DOCUMENTS

| | | | |
|---|---|---|---|
| EP | 0823804 A2 | 2/1998 | ........... H04L/27/26 |
| JP | 7030513 | 1/1995 | ........... H04J/11/00 |

OTHER PUBLICATIONS

Nogami et al., "A Frequency and Timing Period Acquisition Technique for OFDM Systems", 1995, IEEE.
Schmidl et al., "Low–Overhead, Low–Complexity [Burst] Synchronization for OFDM", Stanford University.
Sandell et al., "Timing and Frequency Synchronization in OFDM Systems Using the Cyclic Prefix", Luleå University of Technology, Sweden.

* cited by examiner

Primary Examiner—Stephen Chin
Assistant Examiner—Chieh M. Fan
(74) Attorney, Agent, or Firm—Ritter, Lang & Kaplan LL

(57) ABSTRACT

A burst timing synchronization system useful in, e.g., OFDM communication systems. In one embodiment, this burst timing synchronization system may be impervious to the effects of dispersive channels and robust to noise and other interference. Special synchronization bursts may be used to both provide synchronization information and to carry data.

16 Claims, 4 Drawing Sheets

ENHANCED SYNCHRONIZATION BURST FOR OFDM SYSTEMS

STATEMENT OF RELATED APPLICATIONS

The present application is related to the subject matter of U.S. application Ser. No. 09/245,168, entitled IMPROVED SYNCHRONIZATION IN OFDM SYSTEMS co-filed and co-assigned with the present application.

The present application is related to and claims priority from U.S. Provisional App. No. 60/074,331 filed Feb. 6, 1998.

The contents of both related applications are herein incorporated by reference for all purposes.

BACKGROUND OF THE INVENTION

The present invention relates to digital communication and more particularly to synchronization of certain parameters between a receiver and a transmitter.

In an OFDM (orthogonal frequency division multiplexing) communication system, data is communicated in a series of time domain bursts. To form each time domain burst, an IFFT is applied to a group of frequency domain symbols and a cyclic prefix is added to the transform result prior to transmission. Transmission may involve conversion to an analog signal, conversion to an intermediate frequency (IF), then upconversion to a desired selectable carrier frequency prior to final amplification and propagation across a transmission medium. Upconversion is typically achieved by mixing the IF signal with a variable frequency oscillator signal. The carrier frequency is varied by varying the oscillator frequency.

On the receiver end, preamplification is followed by downconversion to IF from the carrier frequency, again by mixing with a variable frequency oscillator. The resulting IF signal is typically converted to a baseband digital symbol sequence. The cyclic prefix is removed and an FFT is applied to recover the original frequency domain symbols.

For successful communications, certain parameters must be synchronized between the transmitter and the receiver. For example, since OFDM communication proceeds on a burst by burst basis, the receiver and transmitter must agree on exactly when each burst begins. The consequence of missychronization will be lost data.

OFDM communications is particularly useful in environments where signals may take multiple paths from a transmitter to a receiver. OFDM communication systems are also often used in the presence of noise and/or interference.

What is needed is a burst synchronization system that may be used in OFDM communication systems and that performs robustly in the presence of multipath effects, interference, and noise.

SUMMARY OF THE INVENTION

The present invention provides a synchronization system useful in, e.g., OFDM communication systems. In one embodiment, a burst timing synchronization system may be impervious to the effects of dispersive channels and robust to noise and other interference. Special synchronization bursts may be used to both provide synchronization information and to carry data.

In accordance with a first aspect of the present invention, a system for transmitting an OFDM signal via a channel to facilitate receiver synchronization includes a transforming stage that transforms a first series of N frequency domain symbols into a first burst of N time domain symbols and that transforms a second series of M frequency domain data symbols into a second burst of M time domain symbols. A cyclic prefix appending stage appends to a beginning of the first time domain burst a first cyclic prefix duplicating a last segment of the first time domain burst to form a first synchronization burst, and appends to a beginning of the second time domain burst a second cyclic prefix duplicating a last segment of the second time domain burst to form a second synchronization burst. The first and second cyclic prefixes include a first portion having length v wherein v is greater than or equal to a duration of an impulse response of the channel and further include a second portion after the first portion to facilitate receiver synchronization. The first and second synchronization bursts are transmitted concatenated together.

In accordance with a second aspect of the present invention, a system for synchronizing to a received time domain signal includes a receiver system that receives one or more synchronization bursts of symbols. Each of the synchronization bursts includes at least two time domain synchronization sub-bursts. A first of the sub-bursts includes N time domain symbols preceded by a first cyclic prefix. A second of the sub-bursts includes M time domain symbols preceded by a second cyclic prefix. The first and second cyclic prefixes includes a first portion having length v wherein v is greater than or equal to a duration of an impulse response of the channel. The first and second cyclic prefixes further include a second portion after the first portion to facilitate receiver synchronization. The receiver system receives further time domain bursts of symbols. A synchronization block determines burst timing alignment responsive to optimization of a cost function determined responsive to the contents of the one or more synchronization bursts.

Other features and advantages of the invention will become readily apparent upon review of the following detailed description in association with the accompanying drawings.

DESCRIPTION OF SPECIFIC EMBODIMENTS

Figure 1:
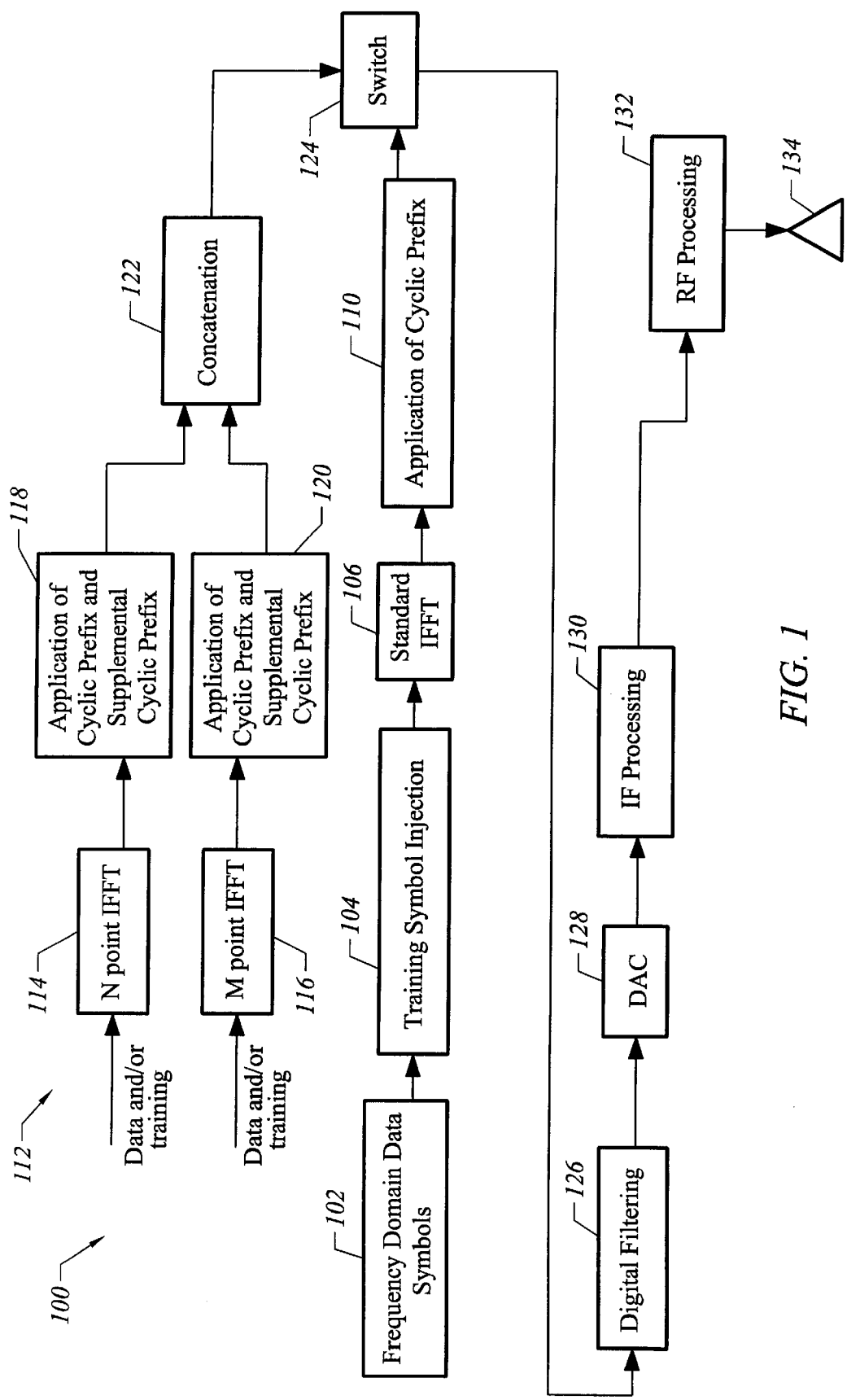
FIG. 1 depicts an OFDM transmitter system according to one embodiment of the present invention.

FIG. 1 depicts an OFDM transmitter system 100 according to one embodiment of the present invention. A source 102 originates data symbols to be transmitted in orthogonal frequency domain subchannels. Any channel coding technique or combination of techniques may be applied to the frequency domain data symbols. To assist in estimating characteristics of the channel, training symbols having known values may be interspersed with the data symbols by a training symbol injection system 104. The output of training symbol injection system 104 is a series of R-symbol frequency domain bursts where R is a length of an IFFT procedure applied by an IFFT processing block 106. IFFT processing block 106 generates time domain output bursts from frequency domain input bursts.

The time domain burst output by IFFT processing block 106 is augmented with a cyclic prefix prior to transmission by a cyclic prefix addition block 110. The cyclic prefix addition process can be characterized by the expression:

$$[z(1) \ldots z(R)]^{r} \mapsto [z(R-v+1) \ldots z(R) \, z(1) \ldots z(R)]^{r}$$

The cyclic prefix has length v where v is greater than or equal to a duration of the impulse response of the channel and assures orthogonality of the frequency domain subchannels. If v>R, then the above expression will not hold and the cyclic prefix will include a latter portion repeating all R time domain symbols as many times as will fit within length v. The remainder of the cyclic prefix that precedes this latter portion will include as many of the last ones of the R IFFT output symbols as needed to fill the cyclic prefix to exactly v symbols.

Functional blocks 102, 104, 106, 110 generate time domain bursts for the transmission of data. In parallel with these function blocks, a synchronization burst generation system 112 generates synchronization bursts having special time domain characteristics to facilitate receiver synchronization. According to one embodiment of the present invention, a special synchronization burst may be formed as a concatenation of two or more sub-bursts. Concatenated together, the synchronization sub-bursts preferably occupy as much time as a non-synchronization burst as output by cyclic prefix addition block 110.

In the depicted embodiment, each synchronization burst includes two sub-bursts. In addition to performing the synchronization function, the sub-bursts may also carry data and/or training. Data and/or training symbols to be carried by a first sub-burst are input to an N-point IFFT processing block 114. Data and/or training symbols to be carried by a second sub-burst are input to an M-point IFFT processing block 116. Cyclic prefix application blocks 118 and 120 apply cyclic prefixes to the time domain outputs of IFFT processing blocks 114 and 116 respectively. According to the present invention, the cyclic prefixes are extended with supplemental cyclic prefixes. Details of the cyclic prefix structure will be described with reference to FIGS. 3A–3B. A concatenation block 122 merges the two sub-bursts together to form a synchronization burst. A switch block 124 selects between synchronization bursts output by concatenation block 122 and non-synchronization bursts output by cyclic prefix application block 110.

A digital filtering stage 126 rejects interpolation images if interpolation is used and attenuates spectral regrowth due to discontinuities at boundaries between OFDM bursts. A digital-to-analog conversion system 128 converts the digital baseband signal, whether complex or real, to analog. An IF processing stage 130 converts the analog signal to an intermediate frequency and performs further filtering. An RF processing system 132 includes further upconversion, amplification and/or filtering prior to transmission via a transmission antenna 134.

Figure 2:
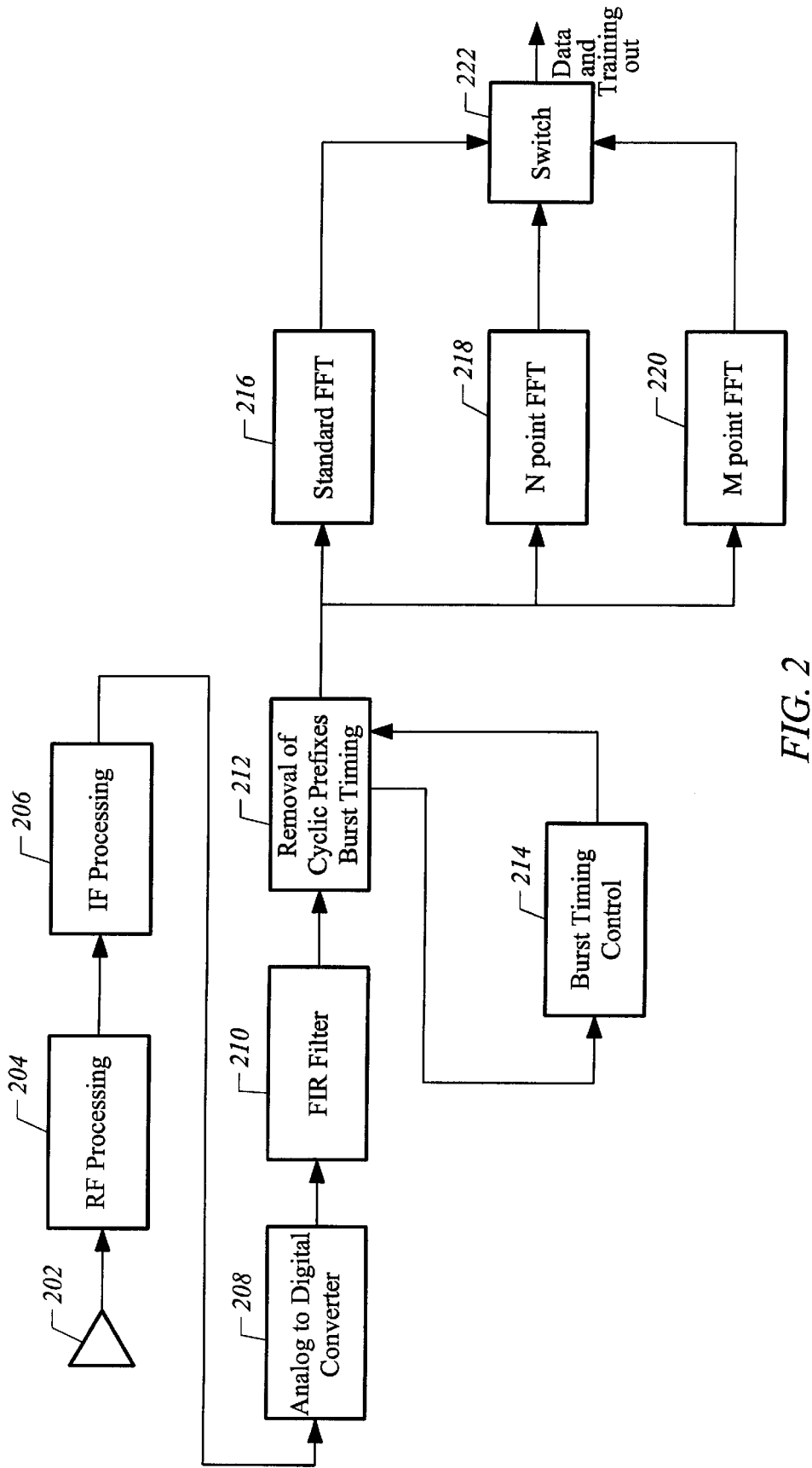
FIG. 2 depicts an OFDM receiver system according to one embodiment of the present invention.

FIG. 2 depicts an OFDM receiver system 200 according to one embodiment of the present invention. An RF antenna 202 receives an RF carrier modulated by a baseband OFDM signal. An RF processing stage 204 performs pre-amplification and filtering at the received frequency as well as downconversion to an intermediate frequency. The IF output of RF processing stage 204 is subject to further filtering and amplification within an IF processing stage 206. An analog to digital conversion system 208 converts the analog IF signal to a complex baseband digital signal. A digital filter 210 rejects any decimation images and out-of-band interference.

The output of digital filter 210 is a series of time domain symbol bursts. A cyclic prefix removal stage 212 sets the boundaries between bursts and removes the cyclic prefixes from received bursts. This includes removal of the extended cyclic prefixes from the sub-bursts of the synchronization bursts. A burst timing control system 214 determines the inter-burst timing based on the structure of synchronization bursts.

Processing of time domain symbols remaining after removal of the cyclic prefix depends on whether the burst is a synchronization or non-synchronization burst. For each non-synchronization burst, the remaining R time domain symbols are transformed to the frequency domain by an R-point FFT processing block 216. For each synchronization burst, the remaining N time domain symbols of the first sub-burst are transformed to the frequency domain by an N-point FFT processing block 218. The remaining M time domain symbols of the second sub-burst are transformed to the frequency domain by an M-point FFT processing block 220. A switch block 222 selects the proper result for output. The output symbols will include data and/or training.

The above-described transmitter system is merely representative. For example, a synchronization burst may include more than two sub-bursts. Furthermore, the overall communication system may be a wireline system rather than a wireless system so some other transmission medium input and output may substitute for the depicted antennas. Also, the present invention may operate in the context of a system that exploits multiple transmission antennas, multiple reception antennas, spatial diversity, and/or spatial processing as described in e.g., PCT Publication No. WO 98/09385, the contents of which are herein incorporated by reference.

Figure 3:
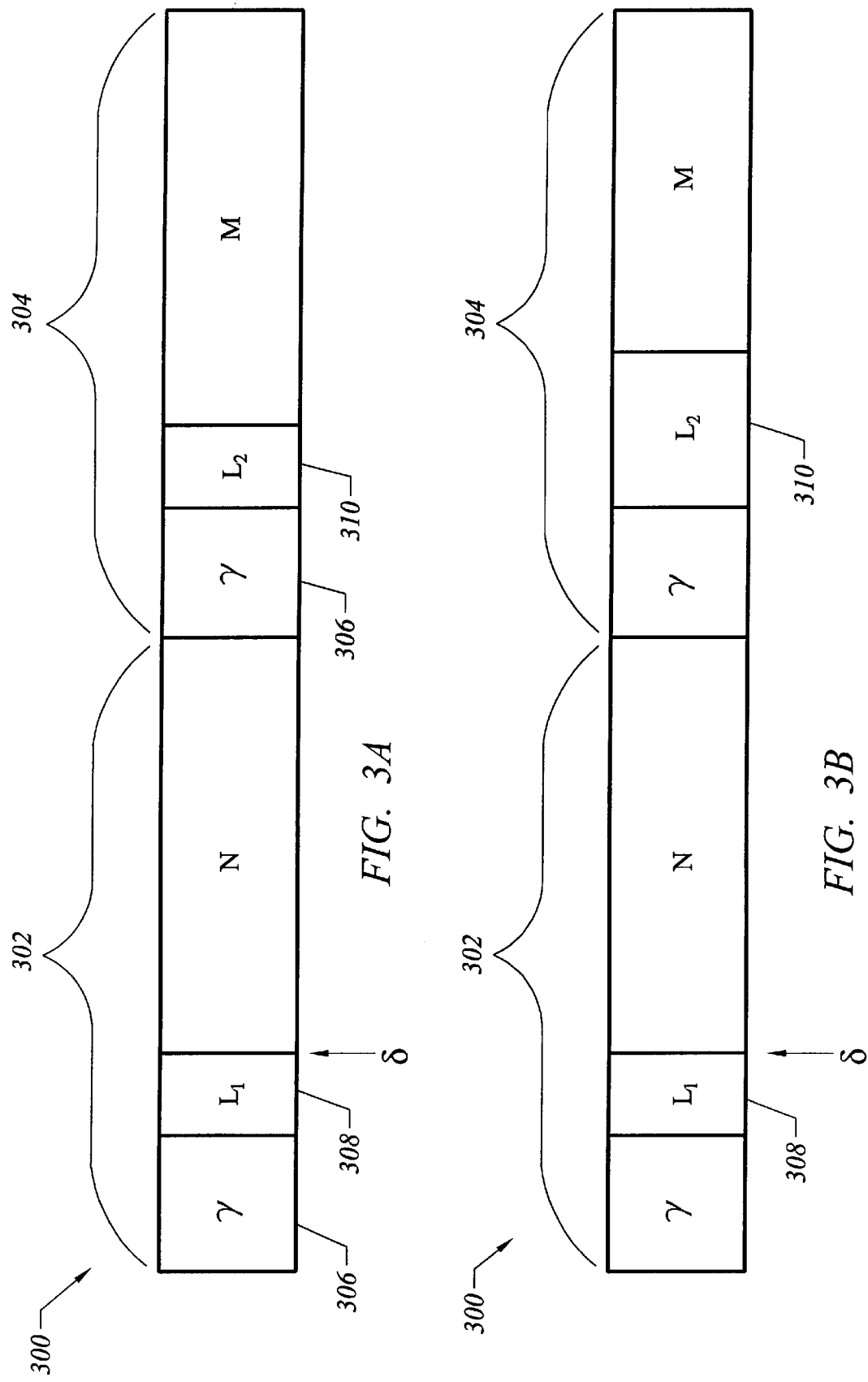
FIGS. 3A–3B depict synchronization bursts according to one embodiment of the present invention.

FIGS. 3A–3B depict representative synchronization bursts according to one embodiment of the present invention. FIG. 3A depicts a synchronization burst 300 including synchronization sub-bursts 302 and 304 where N=M. In FIG. 3A, each sub-burst includes a cyclic prefix 306 having length v where v is at least as long a duration of an impulse response of the channel. Sub-burst 302 includes a supplemental cyclic prefix 308 having length $L_1$ and sub-burst 304 includes a supplemental cyclic prefix 310 having length $L_2$. For sub-burst 302, the combination of cyclic prefix 306 and supplemental cyclic prefix 308 duplicates the last $v+L_1$ of the N time domain symbols resulting from the IFFT. Similarly, for sub-burst 304, the combination of cyclic prefix 306 and supplemental cyclic prefix 310 duplicates the last $v+L_2$ of the M time domain symbols resulting from the IFFT.

According to one embodiment of the present invention, burst timing synchronization is based on correlating the $L_1$ symbols of supplemental cyclic prefix 308 with the last $L_1$ symbols of the N time domain symbols of sub-burst 302 and the $L_2$ symbols of supplemental cyclic prefix 310 with the last $L_2$ symbols of the M time-domain symbols of sub-burst 304. If the receiver's current view of the inter-burst boundary is such that these two segment pairs correlate, receiver burst timing is synchronized to the transmitter. It should also be noted that the supplemental cyclic prefixes 308 and 310 are protected from the distorting effects of inter-burst and inter-sub-burst boundaries by the operation of the v-length cyclic prefixes 308 and 310.

In FIG. 3A, N=M and $L_1=L_2$. In an alternative embodiment of synchronization burst 300 seen in FIG. 3B, $L_2>L_1$ and M<N. In another alternative embodiment, there are four sub-bursts, each incorporate a cyclic prefix and a supplemental cyclic prefix. The supplemental cyclic prefixes may be equal in length or vary. Any combination of values of supplemental cyclic prefix length, transform length, and number of sub-bursts may be used in conjunction with the present invention.

In general, by increasing the number of sub-bursts within synchronization burst 300, one increases the sensitivity of the burst timing cost function so that the cost function increases more rapidly as the burst timing alignment deviates from correct synchronization. Also, increasing the number of transitions increases the percentage of the overall burst length that may be devoted to data and/or training symbols as opposed to cyclic prefixes.

Increasing the length of the supplemental cyclic prefix improves the noise performance of the burst timing synchronization system by providing a greater length segment of symbols over which to check alignment. Of course, it will be appreciated that increasing the supplemental cyclic prefix length decreases the number of symbols available to carry data and/or training. Also, it is preferable that the N and/or M be a power of 2 to allow use of efficient FFT procedures as opposed to the DFT. It should also be noted that training symbols incorporated in any one or more of the sub-bursts may be used to correct the values of data symbols received throughout the burst. Training procedures are discussed in U.S. application Ser. No. 09/234,929, filed on Jan. 21, 1999, entitled IMPROVED OFDM CHANNEL IDENTIFICATION, the contents of which are herein incorporated by reference. In a representative system, there are four sub-bursts within synchronization burst 302, each having the same supplemental cyclic prefix length and each including the same number of symbols from the IFFT output.

Figure 4:
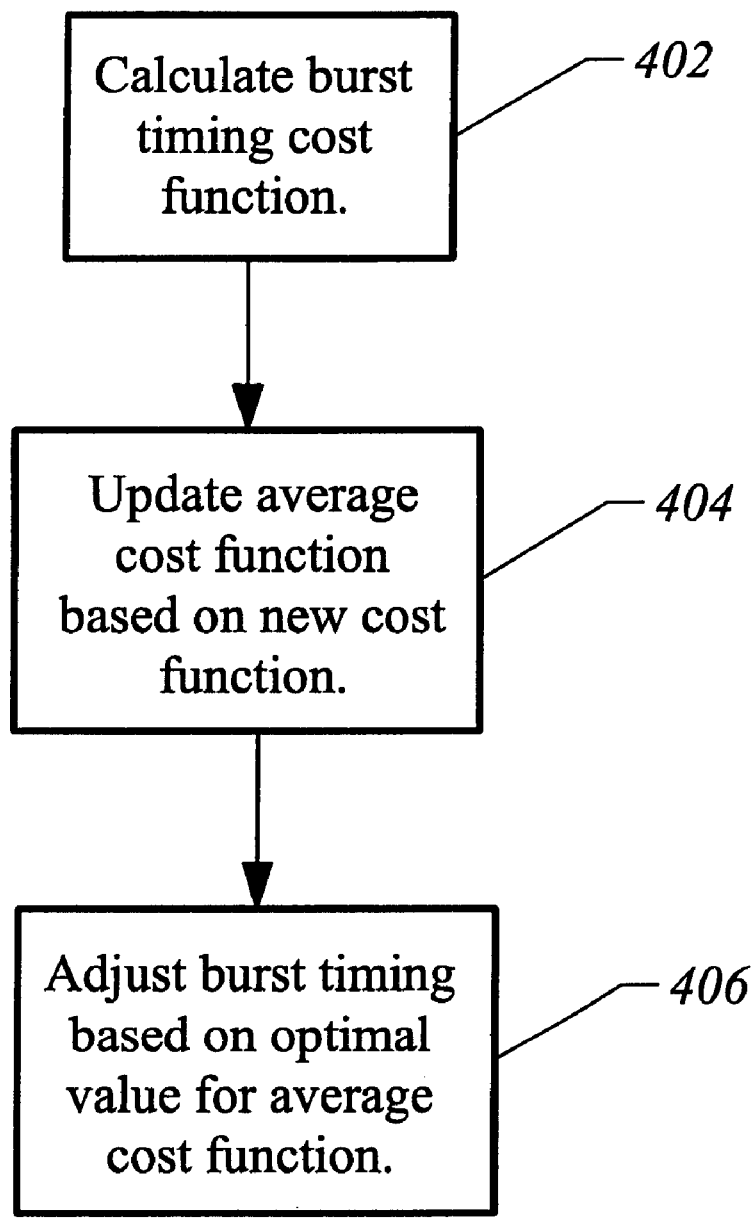
FIG. 4 is a flowchart describing steps of synchronizing a receiver to a transmitter according to one embodiment of the present invention.

FIG. 4 is a flowchart describing steps of synchronizing a receiver to a transmitter according to one embodiment of the present invention. Synchronization bursts are received at fixed intervals. At step 402, for each synchronization burst a cost function is calculated for various values of a burst timing alignment parameter, $\delta$. The optimal value of $\delta$ corresponds to a position after the end of the supplemental cyclic prefix of the first sub-burst as shown in FIG. 3A. For a burst having two sub-bursts as illustrated in FIGS. 3A–3B, the cost function evaluated by burst timing control block 214 is:

$$c(\delta) = \sum_{k=\delta-L_1+1}^{\delta} [|x_i(k)|^2 + |x_i(k+N)|^2] - 2\left|\sum_{k=\delta-L_1+1}^{\delta} x_i(k)^* x_i(k+N)\right| + \sum_{k=\delta-L_2+1+N+v}^{\delta+N+v} [|x_i(k)|^2 + |x_i(k+M)|^2] - 2\left|\sum_{k=\delta-L_2+1+N+v}^{\delta+N+v} x_i(k)^* x_i(k+M)\right|$$

The cost function will be at a minimum where $\delta$ is at its optimal value. It will be appreciated that this cost function can easily be modified to accommodate synchronization burst structures having varying numbers of sub-bursts. The cost functions should preferably also be smoothed with a forward/backward FIR at step 404. Alternatively, the burst timing alignment cost function may also be averaged every, e.g., 32 synchronization bursts. At step 406, the optimal value of $\delta$ is determined for the current average or filtered cost function values and used to set the new burst timing alignment.

According to the present invention, the above-described synchronization burst structure may also be used to synchronize frequency between ends of a link as is done in the co-filed application titled entitled IMPROVED SYNCHRONIZATION IN OFDM SYSTEMS. The integer portion of frequency offset would be evaluated as described there. For the fractional frequency offset, there would then be frequency offset cost functions evaluated for each sub-burst, e.g.:

$$d_N(\delta) = \sum_{k=\delta-L_1+1}^{\delta} x_i(k)^* x_i(k+N)$$

$$d_M(\delta) = \sum_{k=\delta-L_2+1+N+v}^{\delta+N+v} x_i(k)^* x_i(k+M)$$

For the two sub-burst case, the current frequency offset would be evaluated as:

$$f_{\mathit{off}} = \frac{1}{2}\left[\frac{1}{2\pi N}\tan^{-1}d_N(\delta_{opt}) + \frac{1}{2\pi M}\tan^{-1}d_M(\delta_{opt})\right]$$

where $\delta_{opt}$ is the optimal burst timing alignment.

While the above is a complete description of preferred embodiments of the invention, there is alternatives, modifications, and equivalents may be used. It should be evident that the invention is equally applicable by making appropriate modifications to the embodiments described above. Therefore, the above description should not be taken as limiting the scope of the invention that is defined by the metes and bounds of the appended claims along with their full scope of equivalents.

What is claimed:

1. A system for transmitting an OFDM signal via a channel to facilitate receiver synchronization comprising:
    a transforming stage that transforms a first series of N frequency domain symbols into a first burst of N time domain symbols and that transforms a second series of M frequency domain data symbols into a second burst of M time domain symbols;
    a cyclic prefix appending stage that appends to a beginning of said first time domain burst a first cyclic prefix duplicating a last segment of said first time domain burst to form a first synchronization burst, and that appends to a beginning of said second time domain burst a second cyclic prefix duplicating a last segment of said second time domain burst to form a second synchronization burst, said first and second cyclic prefixes including a first portion having length v wherein v is greater than or equal to a duration of an impulse response of said channel; and further including a second portion after said first portion to facilitate receiver synchronization; and
    wherein said first and second synchronization bursts are transmitted concatenated together.

2. The system of claim 1 wherein N equals M.

3. The system of claim 1 wherein N does not equal M.

4. The system of claim 1 wherein said first and second synchronization bursts are transmitted within the same duration that would be reserved for transmission of a single OFDM burst that does not facilitate receiver synchronization but carries data.

5. The system of claim 1 wherein some of the N frequency domain symbols carry data.

6. The system of claim 1 wherein some of the N frequency domain symbols carry training information.

7. The system of claim 1 wherein some of the M frequency domain symbols carry data.

8. The system of claim 1 wherein some of the M frequency domain symbols carry training information.

9. The system of claim 4 wherein one or more further synchronization bursts are transmitted within said duration.

10. A system for synchronizing to a time domain signal received via a channel, said system comprising:

a receiver system that receives one or more synchronization bursts of symbols, each of said synchronization bursts including at least two time domain synchronization sub-bursts, a first of said sub-bursts including N time domain symbols preceded by a first cyclic prefix, a second of said sub-bursts including M time domain symbols preceded by a second cyclic prefix, said first and second cyclic prefixes including a first portion having length v wherein v is greater than or equal to a duration of an impulse response of said channel; and further including a second portion after said first portion to facilitate receiver synchronization, wherein said receiver system receives further time domain bursts of symbols; and a synchronization block that determines burst timing alignment responsive to optimization of a cost function determined responsive to said contents of said one or more synchronization bursts.

11. The system of claim 10 wherein N equals M.

12. The system of claim 10 wherein N does not equal M.

13. The system of claim 10 wherein said first and second time domain synchronization sub-bursts are received within the time period reserved for reception of a single OFDM burst that does not facilitate receiver synchronization but carries data.

14. The system of claim 13 wherein one or more further synchronization time domain sub-bursts are received within said time period.

15. The system of claim 10 wherein said cost function evaluates degree of match between said second portion of said first cyclic prefix and a corresponding portion of said N time domain symbols and between said second portion of said second cyclic prefix and a corresponding portion of said M time domain symbols.

16. In a digital communication system that communicates bursts of symbols via a channel, a method for synchronizing a receiver to burst timing of a transmitter comprising:

receiving one or more synchronization bursts of symbols, each said synchronization bursts including at least two time domain synchronization sub-bursts, a first of said sub-bursts including N time domain symbols preceded by a first cyclic prefix, a second of said sub-bursts including M time domain symbols preceded by a second cyclic prefix, said first and second cyclic prefixes including a first portion having length v wherein v is greater than or equal to a duration of an impulse response of said channel; and further including a second portion after said first portion to facilitate receiver synchronization, wherein said receiver receives further time domain bursts of symbols; and determining burst timing alignment responsive to optimization of a cost function determined responsive to said contents of said one or more synchronization bursts.

* * * * *